Dec. 1, 1959 W. W. HASTINGS 2,914,949

GAUGE MOVEMENT

Filed Sept. 10, 1956

INVENTOR.
WARREN W. HASTINGS
BY
ATTORNEY

United States Patent Office 2,914,949
Patented Dec. 1, 1959

2,914,949
GAUGE MOVEMENT

Warren W. Hastings, Rochester, N.Y., assignor to Rochester Manufacturing Company, Inc., Rochester, N.Y., a corporation of New York Application September 10, 1956, Serial No. 608,923

1 Claim. (Cl. 73—406)

The present invention relates to gauges such as diaphragm-operated pressure gauges, liquid-level gauges, dial-type temperature gauges, and the like.

Heretofore it has been the practice in gauges of the type described to transmit movements of the condition-responsive actuating part through a series of levers and gears to a rotatable pointer. For many applications this type of movement is satisfactory. However, for heavy duty service where pressures may pulsate, mechanical vibration is present, or other rigorous operating conditions are encountered, disadvantages of the conventional gear-type movement have been noted.

An object of the present invention is to provide a gauge having a practical, center-mounted pointer with a full three-hundred degree pointer sweep, without the use of gears.

Another object of the invention is to provide a gearless type of gauge movement applicable to pressure, liquid level, or temperature gauges, and the like, and particularly suited for heavy duty service where rigorous operating conditions are encountered.

These and other objects of the invention are accomplished in the illustrated embodiment of the invention, which applies to a pressure gauge, by a gauge movement in which a crank shaft is actuated by a stud on a pressure-actuated diaphragm. The crank shaft transmits reciprocal movement of the stud to a U-shaped member rotatably mounted on a supported shaft. The U-shaped member has a lever extending therefrom which is angularly movable upon the rotation of the U-shaped member. The end of the lever arm is connected by a cord to a drive shaft on which a pointer is mounted.

The pointer and drive shaft are normally urged toward a zero position against a stop pin on the face of a support plate by a coil spring which surrounds the drive shaft and which is secured to the drive shaft and at its outermost extremity to a stud which is clamped between two bearing plates.

The cord is secured to and wound around the drive shaft in a direction opposite to the coiled direction of the spring. This cord is secured to the lever arm, and in the zero position of the pointer, the lever arm may rest directly against the drive shaft.

In operation, the crank transmits movement of the diaphragm to the U-shaped member, which converts the movement of the diaphragm to angular movement of the lever arm. Deflection of the diaphragm causes movement of the lever arm away from the drive shaft, thus exerting a pull through the cord, which unwinds from the drive shaft and causes its rotation. As the drive shaft rotates, the pointer also rotates away from the stop pin, and the coil spring is wound up, so that upon contraction of the diaphragm, the coil spring expands and causes the string to rewind around the drive shaft, thus returning the indicating pointer toward the zero or datum position, against the stop pin.

The details of the invention will be best understood by reference to the following description thereof and the accompanying drawing.

Figure 1:
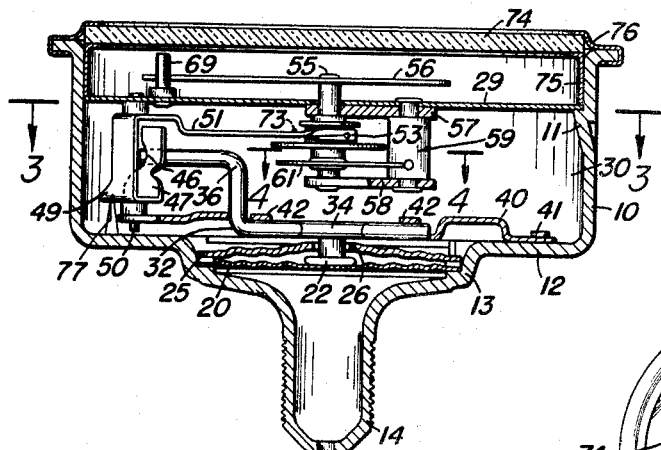
Fig. 1 is a section taken centrally through a gauge constructed in accordance with one embodiment of the invention.
Figure 2:
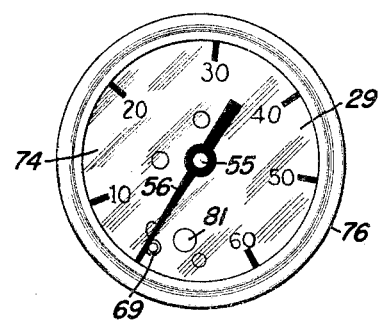
Fig. 2 is a front elevation thereof.
Figure 3:
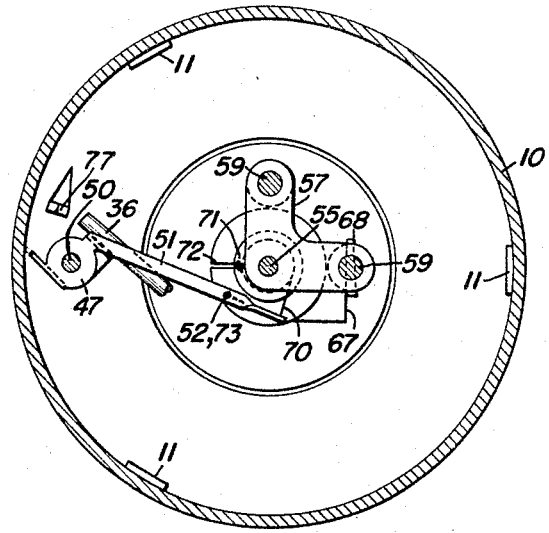
Fig. 3 is a transverse section thereof taken on the line 3—3 of Fig. 1 looking in the direction of the arrows, but showing the lever arm spaced away from the drive shaft.
Figure 4:
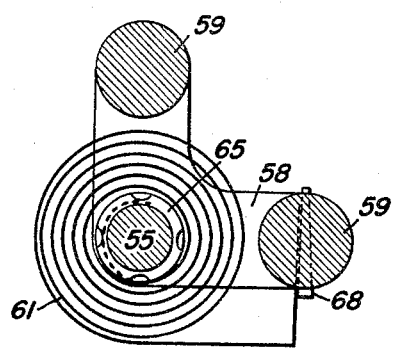
Fig. 4 is a transverse section, on an enlarged scale, of the coil spring and drive shaft, taken on the line 4—4 of Fig. 1 looking in the direction of the arrows.

Referring now to the drawing by numerals of reference, the gauge includes a casing 10 provided with ledges or seats 11, a base portion 12, a diaphragm housing chamber 13, and an externally threaded generally cylindrical stem portion 14. The threaded stem portion 14 is adapted to be threaded into a gas container or the like, and has an opening 15 in its lower end through which the fluid, whose pressure is to be measured, is admitted to the diaphragm chamber.

The upper end of the stem section 14 is closed by a flexible diaphragm 20 which seats on an annular radially-disposed seat in the diaphragm chamber 13. The diaphragm may be made in conventional fashion of relatively thin metal, concentrically corrugated. The operating stud 22 is secured to the diaphragm at its center and projects forwardly from the upper, or front, face of the diaphragm. Instead of being mounted in a recess in the diaphragm and being staked or soldered thereto, the operating stud 22 is preferably welded to the diaphragm, thereby eliminating the possibility of leakage.

The diaphragm is backed up as customary by a relatively stiff and unyielding backing plate 25 which is also corrugated concentrically, so that, if the diaphragm is sufficiently displaced axially, as by subjecting it to heavy pressure, substantially the entire thickness of the diaphragm may come into contact with the backing plate and be supported thereby against rupture. The backing plate has a central hole 26 therein through which the operating stud 22 projects forwardly.

At an intermediate position in the casing 10, a dial and support plate 29 extends across the casing to form an enclosed, cylindrical chamber within which the gauge movement is disposed. This dial plate is supported on the ledges or seats 11. A mounting plate 40 is secured in this chamber on the base 12, and provides support for a shaft 32. Struck up portions of the mounting plate 40 form journals 42 for the crank shaft 32. The mounting plate 40 is held in place on the base 12 by suitable means, such as studs 41 passing through the plate and the base.

The crank shaft 32 includes a small crank portion 34 which is in direct engagement with the operating stud 22 of the diaphragm. Any movement of the operating stud is transmitted through the small crank portion 34 to a larger crank portion 36 which extends downwardly from the crank shaft, and which is adapted to transmit movements of the small crank portion 34 at a mechanical advantage.

The larger crank portion 36 of the crank shaft 32 engages a bearing surface 46 formed as an extension of one arm 47 of a U-shaped member 49 mounted to pivot on a support stem 50 journaled at one end in the support plate 29 and at its opposite end in the mounting plate 40. The other arm of the U-shaped member 49 is extended as a lever arm 51 laterally inwardly and generally toward the center of the chamber 30. This arm 51 is provided at its inner extremity with a pair of apertures 52 and 53.

Approximately at the center of the support plate 29 an aperture is formed to permit the passage therethrough of a drive shaft 55, on which may be mounted an indicating pointer 56. The front surface of the support plate 29 may be marked with appropriate indicia for cooperation with the indicating pointer. A large aperture 81 in the dial plate opens on the lever arm 51.

Figure 5:
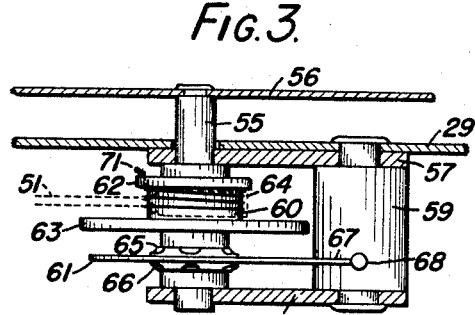
Fig. 5 is a partial side elevation, on an enlarged scale, of the drive shaft and spring assembly.

The drive shaft 55 extends into the chamber 30, and is journaled for support in a pair of parallel bearing plates 57 and 58 respectively. The front bearing plate 57 is secured to the support plate 29, and is spaced from the rear bearing plate 58 by a pair of studs 59. As best shown in Fig. 5, a spool 60 and a coil spring 61 are secured around the drive shaft 55. The spool 60 is formed by a pair of parallel flanges 62 and 63 which are spaced apart by a smooth land 64. Rearwardly of the spool 60, the coil spring 61 is staked in position on the drive shaft 55 between a pair of flanges 65 and 66 respectively.

One end 67 of the coil spring 61 is secured into an opening in one of the studs 59 by a taper pin 68. The spring 61 is coiled so as to bias the drive shaft 55 in one direction so that the pointer 56 is urged toward a stop pin 69 (Fig. 1) which is secured on the front surface of the dial support plate 29.

A nylon cord 70 has a knot 71 inserted in a slot 72 in the smaller flange 62. Alternatively, the knot may be inserted through a similar aligned slot in the larger flange 63. The knot 71 prevents slippage of the string through the slot by bearing against the outer face of the respective flange. The string 70 is wound around the land 64 of the spool and is secured to the lever arm 51 by passage through the apertures 52 and 53 therein and by a knot 73.

As shown in Fig. 1, when the pointer 56 rests against the stop pin 69, in the normal zero position of the gauge, the lever arm 51 may rest directly upon the land 64 of the spool.

A stop tab 77 is struck up from the base 12 of the casing and is positioned to engage against the one arm of the U-shaped member 49 to limit rotation of that member.

The forward end of the casing 10 is closed by a glass 74 that is seated against the spacing ring 75, and which is retained in position by a bezel 76.

In the operation of the device, the operating stud 22 of the diaphragm is moved in response to pressure changes which actuate the diaphragm. The reciprocal movement of the operating stud 22 is transmitted by the small crank portion 34 of the crank shaft 32 to the crank shaft, and the motion of the crank shaft is transmitted at a mechanical advantage through its larger crank portion 36 to the U-shaped member 49. Upon expansion of the diaphragm, the crank causes the U-shaped member 49 to rotate, producing an angular movement of the lever arm 51 and exerting a pull on the cord 70. The cord 70 unwinds from the spool 60, and compresses the spring 61. At the same time, the pointer 56 moves across the face of the dial. Rotation of the U-shaped member is limited by the engagement of its arm against the stop tab 77.

When the pressure on the diaphragm decreases, the expansive force of the spring 61 causes rotation of the drive shaft 55 to move the pointer 56 toward the stop pin 69. At the same time, the cord 70 is rewound on the spool 60, moving the lever arm 51 toward the land 64 of the spool.

The aperture 81 in the face of the dial plate permits access to the lever arm 51 so that the lever arm may be bent to calibrate the gauge.

There has thus been provided a gearless movement for an indicating gauge of the diaphragm type. The drive shaft is actuated by a flexible cord which will not transmit mechanical vibrations. Synthetic plastic cords which have stable dimensional characteristics are preferred. Nylon cord is highly desirable since it is stable dimensionally and is resistant to changes in atmospheric conditions. An important feature of this flexible drive mechanism is the ease of replacement of the flexible drive cord whenever replacement is desirable or necessary.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described my invention, what I claim is:

An indicating gauge comprising a casing, a crank mounted in said casing for rotation in response to an outside stimulus and having an arm offset from but parallel to its axis of rotation, a member rotatably mounted in said casing for rotation about an axis extending at right angles to the axis of rotation of said crank, said member having two arms, one of which is positioned to engage the first-named arm so that said member is rotated upon rotation of said crank, a graduated dial secured in said casing, a shaft mounted in said casing for rotation about an axis parallel to the axis of rotation of said member, said shaft extending through said dial and having an indicating pointer secured thereto to rotate with said shaft and register against the graduations on said dial, a cord connected at one end to the other of said two arms and at its opposite end to said shaft to rotate said shaft upon rotation of said member, said cord being wound around said shaft and being made of a synthetic plastic material which is stable dimensionally, and spring means operatively connected to said shaft to constantly bias said shaft and pointer in one direction toward a datum position and to wind said cord on said shaft.

References Cited in the file of this patent
UNITED STATES PATENTS

| 27,341 | Ashcroft | Mar. 6, 1860 |
|---|---|---|
| 70,213 | Holt | Oct. 29, 1867 |
| 1,338,358 | Champlin | Apr. 27, 1920 |
| 2,123,532 | Hastings et al. | July 12, 1938 |